May 22, 1951 S. H. DOLE 2,554,244
IMPROVING STABILITY OF WAXES
Filed Sept. 11, 1948 2 Sheets-Sheet 2

Stephen H. Dole Inventor
By W. O. T Heilman Attorney

Patented May 22, 1951

2,554,244

UNITED STATES PATENT OFFICE 2,554,244

IMPROVING STABILITY OF WAXES

Stephen H. Dole, Orange, N. J., assignor to Standard Oil Development Company, a corporation of Delaware Application September 11, 1948, Serial No. 48,880

7 Claims. (Cl. 196—21)

The present invention is concerned with the production of high quality waxes. The invention is more particularly directed toward the production of waxes having improved stability with respect to heat and light. In accordance with the present invention, crude waxes which may be produced by any conventional manufacturing method, are contacted within a critical high temperature range with a solid contacting mass comprising oxides of aluminum as, for example, bauxite.

It is well known in the art to produce refined petroleum waxes by various procedures. One procedure, for example, is to chill the waxy distillate and to pass the chilled distillate through presses in order to segregate the so-called "slack wax." The slack wax is passed into a distillation zone which comprises a pipe still and the lower boiling oily fractions removed therefrom to produce a so-called "topped slack wax." The oil content of this latter wax fraction may vary considerably depending upon the extent to which the pressing and distillation operations are carried out. In general, however, the oil content of the topped slack wax is in the range from about 15-35%. The topped slack wax is generally introduced into sweating units wherein the temperature of the wax is gradually raised and oil permitted to seep or flow therefrom. The rate at which the temperature is raised in the sweater and the particular fractions withdrawn and segregated may be varied by conventional procedure depending upon the specific melting point wax fractions desired. In accordance with the present invention it is preferred that the wax fractions have a melting point above about 90° F., and preferably have a melting point above 120° F. In accordance with procedures heretofore employed, crude scale waxes having an oil content in the range from about 3-10% are resweated or further handled by other known procedures. As a matter of fact, in order to improve the wax stability with respect to heat and light, a procedure employed in the art is to treat the crude scale wax prior to resweating with sulfuric or an equivalent acid. The crude scale wax may be secured by other procedures as, for example, by known solvent dewaxing procedures wherein dewaxing solvents such as propane, methyl-ethyl ketone, and the like are utilized.

As pointed out heretofore, in the manufacture of high quality waxes it is essential that these waxes have a good color, and are also stable when exposed to heat and light. Heretofore it has been relatively difficult to produce a refined wax by conventional and known procedures, which wax will have high stability with respect to heat and light. One procedure, conventionally employed in order to produce wax having high stability with respect to heat and light, is to treat the sweated waxes with various reagents as, for example, sulfuric acid. Another procedure is to hydrogenate the wax. While these procedures in general are usually satisfactory, they are relatively expensive and time consuming.

In accordance with the present invention, improved waxes having high stability with respect to heat and light are produced by subjecting a crude wax to treatment with bauxite within a critical temperature range. The process of the present invention may be readily understood by reference to the drawings illustrating various embodiments of the same.

Figure 1:
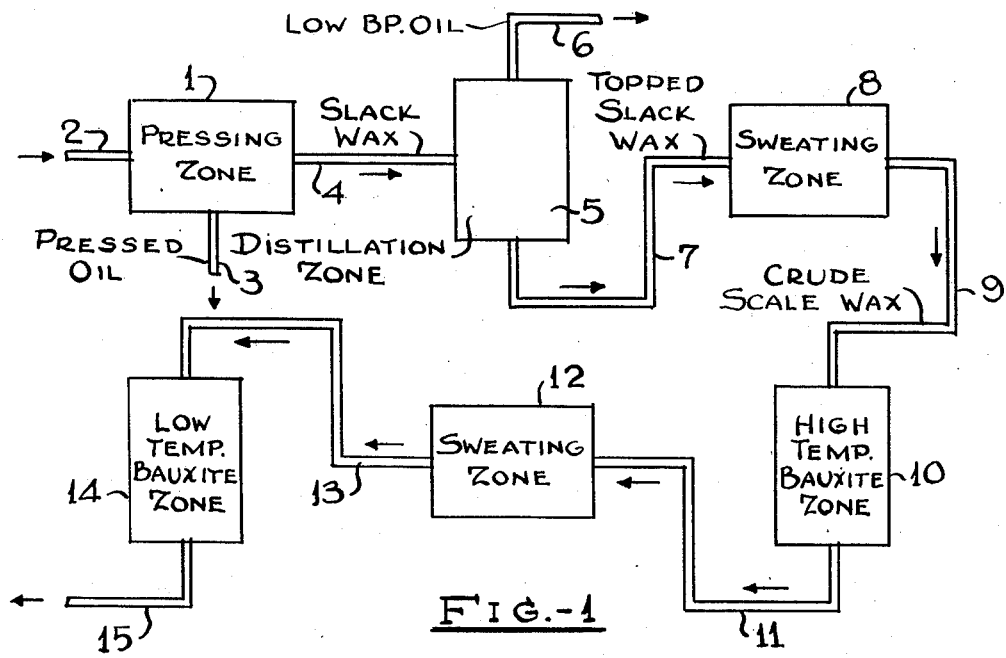
Figure 1 illustrates the present invention wherein a high temperature and low temperature bauxite treating operation is employed in combination with an intermediate sweating operation.

Referring specifically to Figure 1, a waxy distillate as, for example, a distillate secured from a Salt Flat, a Panhandle, or a Reagan crude, is introduced into pressing zone 1 by means of feed line 2. For the purpose of illustration, it is assumed that the waxy distillate boils in the gas oil and light lubricating oil boiling ranges. In general, these fractions boil in the range from about 450° to 800-900° F. For the purpose of illustration, it is assumed that pressing zone 1 comprises suitable chillers and dewaxing elements. The pressed oil is removed through line 3. The slack wax is removed from pressing zone 1 by means of line 4, and usually contains from about 15-40% oil. This slack wax is introduced into distillation zone 5 wherein temperature and pressure conditions are adapted to remove overhead lower boiling oily fractions by means of line 6. The topped slack wax containing from about 15-35% oil is removed from distillation zone 5 by means of line 7. This wax is introduced into sweating zone 8 wherein the same is subjected to gradually rising temperatures. The oily constituents are removed in any desired fractions and the various fractions of the wax also segregated as desired. For the purpose of illustration, it is assumed that the entire crude scale wax is removed as one stream by means of line 9 and that said stream contains less than about 10% of oil, preferably less than 3% of oil.

In accordance with the process of the present invention, this crude scale wax, containing less than about 10% of oil, preferably less than 3% of oil, is introduced into bauxite treating zone 10 by means of line 9. Zone 10 is maintained at a temperature above about 575° F., preferably at a temperature in the range from about 600-700° F. The treating medium utilized in zone 10 comprises aluminum oxide, preferably bauxite. It is preferred that the bauxite utilized be dried at a temperature above 600° F., preferably at a temperature above 1000° F., in order to substantially completely remove the water content. The treated waxy fraction is withdrawn from the bottom of zone 10 by means of line 11 and is introduced into a secondary sweating zone 12. Temperature and pressure conditions are adjusted in sweating zone 12 so as to reduce the oil content of the wax fraction to below about 0.5%. The wax fraction is withdrawn from zone 12 by means of line 13 and passed through a secondary bauxite zone 14. Zone 14 contains bauxite which has been preferably dried at a temperature in the range above 600-1000° F. In general, the temperature in zone 14 is maintained below about 200° F., preferably in the range of 140-180° F. A refined wax having high stability, particularly with respect to heat and light, is withdrawn from zone 14 by means of line 15, and handled in any manner desired.

Figure 2:
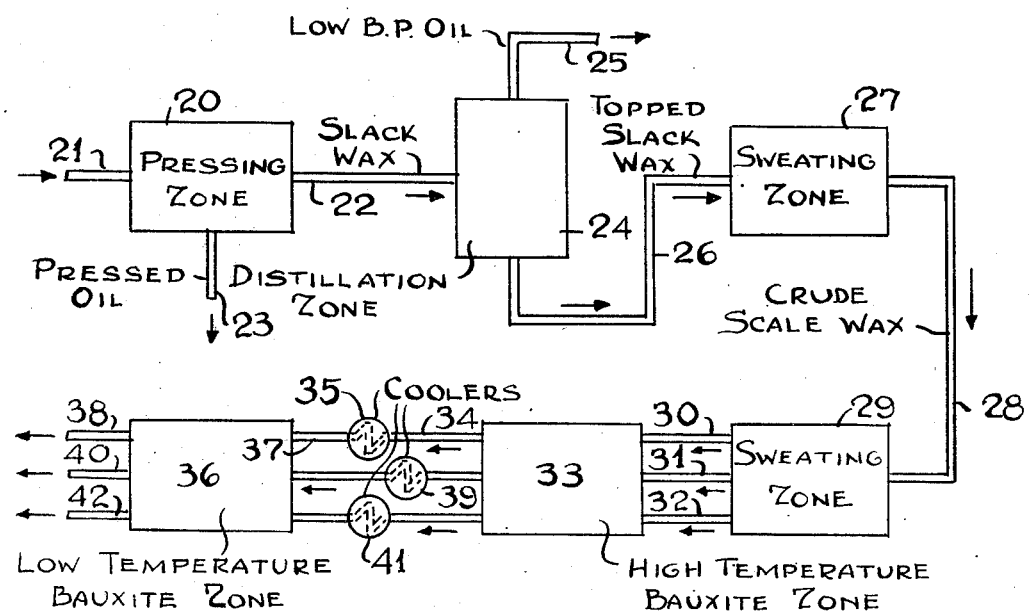
Figure 2 illustrates an adaptation of the present invention wherein no intermediate operation is utilized between the high temperature and the low temperature bauxite treatment.

Referring specifically to Figure 2, a waxy distillate, similar to that described with respect to Figure 1, is introduced into pressing zone 20 by means of line 21. Conditions are adjusted to produce a slack wax fraction which is withdrawn from zone 20 by means of line 22. The pressed oil fraction is removed by means of line 23. In general, the oil content of this slack wax fraction is in the range from about 15-40%. The slack wax fraction is introduced into distillation zone 24 wherein temperature and pressure conditions are adjusted to remove the overhead lower boiling oily fractions by means of line 25. A topped slack wax fraction is removed from the bottom of distillation zone 24 by means of line 26 and introduced into sweating zone 27. In general, the oil content of the wax fraction removed by line 26 is in the range from about 15-35%. Temperature and pressure conditions are adjusted in zone 27 so as to produce a crude scale wax which is removed by means of line 28 and which has an oil content in the range from about 2-10%. This crude scale wax is introduced into a secondary sweating zone 29 in which temperature and pressure conditions are adjusted to produce various wax fractions, the oil content of which is below about 0.5%. For the purpose of illustration, the various wax fractions having different melting points are shown as being withdrawn by means of lines 30, 31, and 32. It is to be understood that any number of fractions may be segregated by known means, and that the average melting point of the respective fractions can be adjusted as desired. It is obvious that the lowest melting point fraction will be segregated first, that an intermediate melting point fraction will be segregated next, and that finally the highest melting point fraction will be segregated. For the purpose of illustration, it is assumed that the lowest melting point fraction is segregated and removed from sweating zone 29 by means of line 30. This fraction is introduced into a high temperature bauxite treating zone 33, wherein the temperature is maintained above about 575° F., preferably in the range from about 600-700° F. The feed rate may vary considerably but is preferably maintained at 1 volume of wax per volume of bauxite per hour. The low melting point wax fraction is withdrawn from high temperature zone 33 by means of line 34, cooled in cooler 35, and introduced into a low temperature bauxite treating zone 36 by means of line 37. In general, the temperature in zone 36 is maintained below about 200° F., and is preferably in the range of 140-180° F. It is obvious that the temperature in the low temperature bauxite treating zone must be sufficient to keep the waxy fraction in the liquid state. A highly refined, highly stable, low melting point wax is withdrawn from zone 36 by means of line 38 and handled as desired.

In a similar manner the intermediate melting point wax fraction is withdrawn from zone 29 by means of line 31, passed through bauxite zone 33, cooled in a cooling zone 39, contacted with bauxite in the low temperature zone 36, and is withdrawn as a highly refined wax by means of line 40. The high melting point wax fraction is withdrawn from zone 29 by means of line 32, treated with bauxite at a high temperature in zone 33, cooled in cooling zone 41, treated with bauxite at a relatively low temperature in zone 36 and withdrawn as a high quality refined wax from zone 36 by means of line 42.

Figure 3:
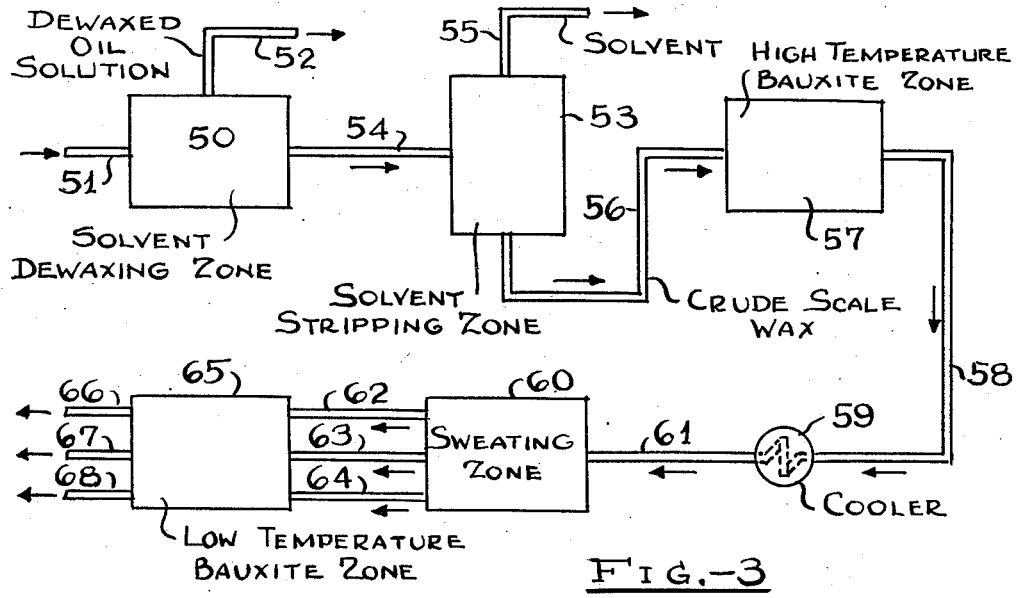
Figure 3 illustrates an embodiment of the present invention wherein the crude scale wax is secured by solvent dewaxing operations and wherein an intermediate sweating operation is utilized between the high and low temperature bauxite treatment.

Referring to Figure 3, lube distillate is introduced into solvent dewaxing zone 50 through line 51. The dewaxed oil solution is taken out through line 52 and the wax solution containing about 10% oil or less is introduced into the solvent stripping zone 53 through line 54. The solvent is taken off through line 55, and the crude wax is passed through line 56 into high temperature bauxite treating zone 57, wherein the temperature is maintained above about 575° F., preferably in the range from about 600-700° F. The treated wax is withdrawn from high temperature zone 57 by means of line 58, cooled in cooler 59, and introduced into sweating zone 60 by means of line 61. Temperature and pressure conditions are adjusted in zone 60 so as to produce a wax which has an oil content which is below about 0.5%. For the purpose of illustration, the various wax fractions having different melting points are shown as being withdrawn by means of lines 62, 63, and 64. It is understood that any number of fractions may be segregated by known means, and that the average melting point of the respective fractions can be adjusted as desired. For the purpose of illustration, it is assumed that the lowest melting point fraction is segregated and removed from sweating zone 60 by means of line 62. This fraction is introduced into the low temperature bauxite treating zone 65 by means of line 62. In general, the temperature in zone 65 is maintained below about 200° F., and is preferably in the range of 140-180° F. A highly refined, highly stable, low melting point wax is withdrawn from zone 65 by means of line 66 and handled as desired.

In a similar manner the intermediate melting point wax fraction is withdrawn from zone 60 by means of line 63, is contacted with bauxite in low temperature zone 65, and is withdrawn as a high quality refined wax from zone 65 by means of line 67.

The high melting point wax fraction is withdrawn from zone 60 by means of line 64, introduced into bauxite finishing zone 65, and is withdrawn as a high melting point refined wax by means of line 68.

Figure 4:
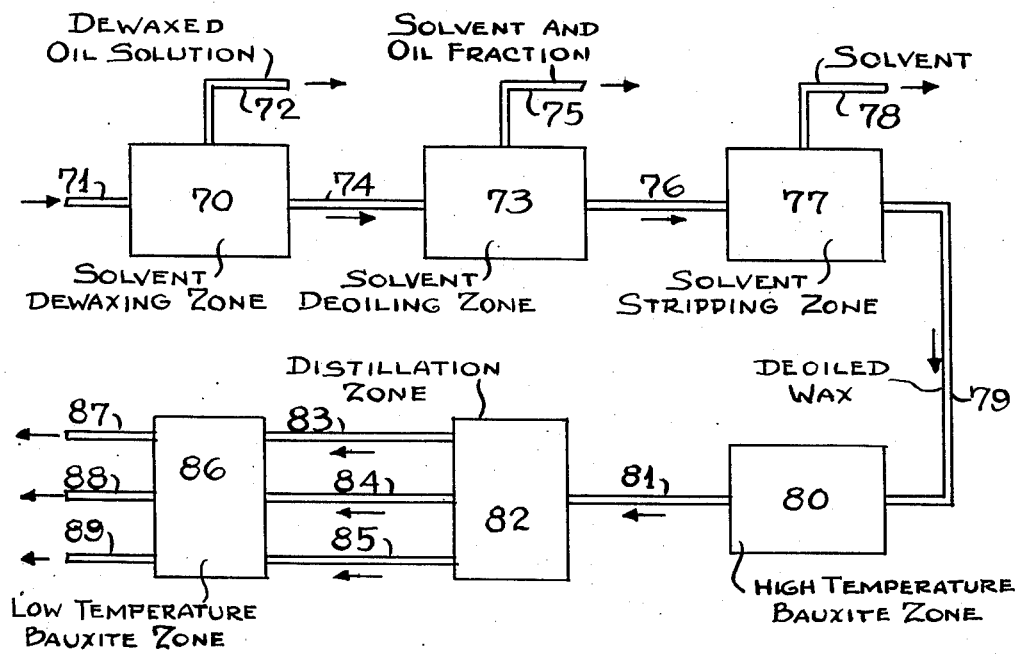
Figure 4 illustrates an adaptation of the present invention wherein a fractional distillation operation is employed for the separation of definite melting point waxes between the high temperature and low temperature bauxite treatment.

Referring specifically to Figure 4, a lube distillate similar to that described with respect to Figure 3, is introduced into solvent dewaxing zone 70 by means of line 71. The dewaxed oil solution is withdrawn through line 72. The wax containing less than about 10% oil is introduced into solvent deoiling zone 73 by means of line 74. The solvent and oil fraction is withdrawn through line 75. The wax fraction containing below about 0.5% oil is introduced into solvent stripping zone 77 by means of line 76. The solvent is taken off completely through line 78. The deoiled wax is introduced through line 79 into a high temperature bauxite treating zone 80 wherein the temperature is maintained above about 575° F., preferably in the range from about 600°–700° F. The treated wax is then passed through line 81 into distillation zone 82 wherein the temperature is adjusted to produce various wax fractions, having different melting points. For the purpose of illustration, the various wax fractions having different melting points are shown as being withdrawn by means of lines 83, 84 and 85. It is to be understood that any number of fractions may be segregated by known means and that the average melting point of the respective fractions can be adjusted as desired. For the purpose of illustration, it is assumed that the lowest melting point fraction is distilled and removed by means of line 83. This fraction is introduced into low temperature bauxite zone 86. In general the temperature in zone 86 is maintained below about 200° F. and is preferably in the range of 140°–180° F. Highly refined, highly stable, low melting point wax is withdrawn from zone 86 by means of line 87 and handled as desired.

In a similar manner the intermediate melting point wax fraction is withdrawn from zone 82 by means of line 84, passed through bauxite zone 86 and is withdrawn as a highly refined wax by means of line 88. The high melting point wax fraction is withdrawn from zone 82 by means of line 85, passed through bauxite zone 86 and is withdrawn as a highly refined wax by means of line 89.

In accordance with the process of the present invention, it is essential that the waxy fractions be contacted with the bauxite at a temperature above about 575° F. The preferred temperature range for contacting the waxy fractions with the bauxite is from about 600–700° F. The pressure employed is preferably atmospheric. Under these conditions substantially no reduction in the sulfur content of the wax fraction is secured, nor is there a substantial cracking of the wax.

In accordance with a preferred adaptation of the invention, it is preferable to employ a low temperature bauxite treatment of the waxy fractions in conjunction with the high temperature bauxite treatment. When utilizing a low temperature bauxite treatment, the temperature of the low bauxite treatment should not exceed about 200° F., and is preferably in the range of 140–180° F. It is preferred that substantially atmospheric pressure be utilized in the low temperature bauxite treatment.

A still further preferred adaptation of the invention is to employ an intermediate operation adapted to further remove oily constituents from the waxy constituents between the high temperature bauxite treatment and the low temperature bauxite treatment. This intermediate treatment may comprise a sweating operation or a solvent deoiling operation for the purposes of the present invention.

The invention may be further illustrated by the following examples:

EXAMPLE 1

A waxy distillate secured from a Panhandle crude was processed in accordance with the present invention, as described in Figure 1, to produce a crude scale wax fraction having a melting point of 131° F., and an oil content of 3.5%. Portions of this crude wax fraction were treated at 600° F., with activated carbon, with a silica-alumina catalyst containing 86–88% silica gel and 12–14% alumina, and with a high purity bauxite which was calcined at 1000° F., said bauxite containing less than 3% water and other impurities below about 3%. The respective waxy fractions were removed from the treating agents and sweated in an intermediate operation to an oil content of less than about 0.3%. The sweated waxy fractions were then finished by contacting with bauxite at a temperature of 165° F.

The results of the respective runs are as follows:

*High temperature percolation of crude scale wax*

| Treating Conditions | | Treated Wax | | |
|---|---|---|---|---|
| Treating Medium | | Activated Carbon | Silica 86–88%; Alumina 12–14% | Bauxite |
| Temperature, °F | | 600 | 600 | 600 |
| Feed Rate | | | 1 v./v./hr. | |
| Feed Wax (131° F. M. P.) | Feed Stock | | | |
| Oil Content, Weight Per Cent | 3.5 | 3.3 | 3.8 | 3.4 |
| Color, Tag Robinson | 13 | 19 | 10 | 18 |
| Sulfur, Weight Per Cent | 0.1 | 0.1 | 0.1 | 0.1 |
| *Sweated Wax (<0.3% Oil)* | | | | |
| Yield, Weight Per Cent on Charge | | 29 | 30 | 32 | 30 |
| Color, Saybolt | | +4 | +20 | −1 | +20 |
| *Refined Wax (Bauxite Finished)* | | | | |
| Melting Point, °F | | 137 | 138 | 138 | 137 |
| Heat Stability Saybolt [1] | | [3] 10TR | 19TR | +7 | +6 |
| N. F. Acid Test [2] | | 10(DNP) | [4] 10(DNP) | 10(DNP) | 5 (Pass) |

[1] Heat stability: The wax is maintained at 302° F. for 16 hours in the presence of copper strip and the color of the wax is then determined.
[2] N. F.—National Formulary test.
[3] TR—Tag Robinson.
[4] DNP—Did not pass.

It will be noted that the percentage sulfur by weight is the same after the wax was percolated through bauxite as it was in the feed stock. It will also be noted that the percentage oil content of the bauxite treated wax is almost substantially the same by weight as found in the feed stock. The high temperature treatment of crude scale wax percolated through bauxite at 600° F. and atmospheric pressure, showed an excellent improvement over the feed stock as shown in the heat stability and N. F. acid tests, whereas waxes percolated through activated carbon and silica-alumina did not.

EXAMPLE 2

In the following experiment a wide range of temperatures were used for the percolation of the crude scale wax through bauxite. The temperatures involved were from 170° F. to 700° F. Above 700° F. it was noted that cracking occurred with a considerably high percentage of oil forming in the wax. At 170° F., 450° F. and 550° F. the crude scale wax exhibited a poor heat stability and N. F. acid tests.

The crude scale wax treated at a temperature range of 600-700° F. exhibited no increase in oil content and the sulfur content was substantially unaffected as compared to the feed stock. The bauxite treated wax also exhibited good results in the heat stability and N. F. acid tests.

This invention clearly shows that waxes can be treated at high temperatures above about 575° F., preferably 600-700° F., wherein substantially no sulfur reduction or cracking occurs, rendering a highly stable and highly refined wax.

The results of the respective runs are as follows:

*High temperature percolation of untreated Panhandle crude scale wax over bauxite*

| Treating Conditions: Catalyst | | Bauxite | | | | | |
|---|---|---|---|---|---|---|---|
| Temperature, ° F | | 170 | 450 | 550 | 600 | 650 | 700 |
| Feed Rate | | 1 v./v./hr. | | | | | |
| | Feed Stock | | | | | | |
| (1) *Treated Product* | | | | | | | |
| M. P., ° F | 131 | 131 | 131 | 132 | 131 | 131 | 131 | 131 |
| Per Cent Oil (ASTM) | 3.5 | 3.5 | 3.5 | 3.4 | 3.4 | 3.8 | 3.9 |
| Color, Tag Robinson | 13 | 17 | 19 | 17 | 18 | 16 | 13 |
| Sulfur, Weight Per Cent | 0.12 | 0.10 | 0.10 | 0.08 | 0.12 | 0.10 | 0.12 |
| *Refined Wax—By Sweating* | | | | | | | |
| Yield, Weight Per Cent on Charge | 29 | 29 | 26.9 | 27.6 | 30.3 | 30.9 | 31.1 |
| Color, Before Finishing, Saybolt | +4 | +18 | +30 | +21 | +20 | +18 | +16 |
| (2) *After Bauxite Finishing* | | | | | | | |
| M. P., ° F | 137 | 137 | 138 | 138 | 137 | 138 | 138 |
| Per Cent Oil (ASTM) | 0.3 | 0.3 | | | 0.3 | 0.3 | 0.3 |
| Color, Saybolt | +30 | +30 | +30 | +30 | +30 | +30 | +30 |
| Heat Stability | 10TR | 9½TR | 17TR | −13 | +6 | +14 | +16 |
| N. F. Acid Test | 10DNP | 10DNP | DNP | DNP | 5 Pass | 4 Pass | 4 Pass |

What is claimed is:

1. An improved process for the production of waxes, having high stability with respect to heat and light, from crude oils containing waxy constituents which comprises separating the waxy constituents in a manner so that said constituents have an oil content in the range below about 10%, passing said waxy constituents over bauxite at a temperature in the range from about 600-700° F., removing said waxy constituents and recontacting the same with bauxite at a temperature in the range from about 140° to 200° F.

2. Improved process for the manufacture of high quality waxes from a crude oil, which comprises segregating a waxy distillate, subjecting said waxy distillate to pressing to produce a slack wax, subjecting said slack wax to distillation in order to remove therefrom lower boiling oily constituents and to produce a topped slack wax fraction containing from about 15-35% oil, sweating said topped slack wax fraction under conditions to produce a crude scale wax fraction having an oil content in the range from about 2-6%, passing said crude scale wax fraction through a solid adsorbent consisting of bauxite at a temperature in the range from about 600-700° F., removing waxy constituents and subjecting the same to resweating in order to reduce the oil content to below about 0.5%, then recontacting the wax fraction with bauxite at a temperature in the range from about 140-200° F., whereby a refined high quality wax having a high stability with respect to heat and light is produced.

3. Process as defined by claim 2 wherein the reaction conditions are regulated in a manner so that the sulfur and oil content of the wax remains substantially unaffected.

4. Improved process for the manufacture of high quality waxes from a crude oil which comprises segregating a waxy distillate, solvent treating the waxy distillate for the removal of oily constituents to produce a crude scale wax fraction containing less than about 10% oil, passing said crude scale wax fraction to a solvent stripping zone and separating the solvent therefrom, passing the crude scale wax fraction through a solid adsorbent consisting of bauxite at a temperature in the range from about 600-700° F. removing waxy constituents and subjecting the same to sweating in order to reduce the oil content to below about 0.5%, then contacting said wax fraction with bauxite at a temperature in the range from about 140-200° F. whereby a refined high quality wax having a high stability with respect to heat and light is produced.

5. Improved process for the manufacture of high quality waxes from a crude oil which comprises segregating a waxy distillate, solvent treating the waxy distillate for the removal of lower boiling oily constituents to produce a crude scale wax fraction containing less than about 10% oil, treating said crude scale wax fraction with additional solvent in a deoiling zone for the further removal of lower boiling oily constituents, separating a wax fraction containing below about 0.5% of oil, passing said wax fraction to a solvent stripping zone, separating the solvent therefrom, passing the solvent free wax fraction through a solid adsorbent consisting of bauxite at a temperature in the range from about 600–700° F., removing waxy constituents therefrom, recontacting the waxy constituents with bauxite at a temperature in the range from about 140–200° F. whereby a refined high quality wax having a high stability with respect to heat and light is produced.

6. Improved process for the manufacture of high quality waxes from a crude oil which comprises segregating a waxy distillate, solvent treating the waxy distillate for the removal of lower boiling oil constituents to produce a crude scale wax fraction containing less than about 10% oil, passing said crude scale wax fraction to a solvent stripping zone and separating the solvent therefrom, passing the crude scale wax fraction through a solid adsorbent consisting of bauxite at a temperature in the range from about 600–700° F. removing waxy constituents, adding solvent and subjecting the same to a solvent deoiling operation in order to reduce the oil content to below about 0.5% passing said waxy fraction to a solvent stripping zone and separating the solvent therefrom, then recontacting the waxy fraction with bauxite at a temperature in the range from about 140–200° F. whereby a refined high quality wax having a high stability with respect to heat and light is produced.

7. Improved process for the manufacture of high quality waxes from crude oil, which comprises segregating a waxy distillate, subjecting said waxy distillate to pressing to produce a slack wax, subjecting said slack wax to distillation in order to remove therefrom lower boiling oily constituents and to produce a topped slack wax fraction containing from about 15–35% oil, passing said topped slack wax fraction through a solid adsorbent consisting of bauxite at a temperature in the range from about 600–700° F., removing waxy constituents, adding solvent thereto and subjecting the same to a solvent deoiling operation in order to reduce the oil content to below about 0.5%, passing the waxy fraction to a solvent stripping zone and separating the solvent therefrom, then recontacting the wax fraction with bauxite at a temperature in the range from about 140–200° F. whereby a refined high quality wax having a high stability with respect to heat and light is produced.

STEPHEN H. DOLE.

REFERENCES CITED

The following references are of record in the file of this patent:

UNITED STATES PATENTS

| Number | Name | Date |
|---|---|---|
| 1,973,468 | Mueller-Cunradi et al. | Oct. 17, 1933 |
| 1,973,833 | Wietzel | Sept. 18, 1934 |
| 2,121,518 | Breth | June 21, 1938 |
| 2,273,726 | Renshaw | Feb. 17, 1942 |
| 2,320,223 | Dempsey | May 25, 1943 |
| 2,397,969 | Macke et al. | Apr. 9, 1946 |
| 2,429,727 | Macke et al. | Oct. 28, 1947 |